United States Patent
Cheng

(10) Patent No.: US 11,782,756 B2
(45) Date of Patent: Oct. 10, 2023

(54) METHOD AND APPARATUS FOR SCHEDULING PROCESSOR CORE, AND STORAGE MEDIUM

(71) Applicant: GUANGDONG OPPO MOBILE TELECOMMUNICATIONS CORP., LTD., Guangdong (CN)

(72) Inventor: Jie Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 461 days.

(21) Appl. No.: 17/069,289

(22) Filed: Oct. 13, 2020

(65) Prior Publication Data
US 2021/0026688 A1 Jan. 28, 2021

Related U.S. Application Data

(63) Continuation of application No. PCT/CN2019/083520, filed on Apr. 19, 2019.

(30) Foreign Application Priority Data

Apr. 20, 2018 (CN) .......................... 201810362695.6

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/3877* (2013.01); *G06F 9/4401* (2013.01);
(Continued)

(58) Field of Classification Search
CPC ...... G06F 9/4881; G06F 9/451; G06F 9/3877; G06F 9/4401; G06F 9/44505;
(Continued)

(56) References Cited

U.S. PATENT DOCUMENTS 9,830,187 B1 * 11/2017 Blaine ................. G06F 9/4881
2005/0021501 A1 1/2005 Butron
(Continued)

FOREIGN PATENT DOCUMENTS

CN 101196816 A 6/2008
CN 101385000 A 3/2009
(Continued)

OTHER PUBLICATIONS

Korean Office Action with English Translation for KR Application 1020207032552 dated Mar. 11, 2022. (10 pages).
(Continued)

*Primary Examiner* — Wissam Rashid
(74) *Attorney, Agent, or Firm* — Young Basile Hanlon & MacFarlane, P.C.

(57) ABSTRACT

A method and apparatus for scheduling a processor core and a medium are provided. The method is applied to a terminal. The method includes: sending, by a target application, a target request to the operating system by calling a first application programming interface (API) provided by an embedded software development kit (SDK), the target request being used to indicate the operating system to feed back core information of the processor, and the core information including a configuration condition of the first performance core and the second performance core; feeding back, by the operating system, the core information to the target application; and scheduling, by the target application, a target core to operate a process of the target application in a system calling way based on the core information.

20 Claims, 9 Drawing Sheets sending, by a target application, a target request to the operating system by calling a first application programming interface (API) provided by an embedded software development kit (SDK), the target request being used to indicate the operating system to feed back core information of the processor, and the core information comprising a configuration condition of the first performance core and the second performance core — 701 feeding back, by the operating system, the core information to the target application — 702 scheduling, by the target application, a target core to operate a process of the target application in a system calling way based on the core information — 703

(51) Int. Cl.

| | |
|---|---|
| *G06F 9/54* | (2006.01) |
| *G06F 9/451* | (2018.01) |
| *G06F 9/38* | (2018.01) |
| *G06F 9/4401* | (2018.01) |
| *G06F 9/445* | (2018.01) |
| *G06F 11/34* | (2006.01) |

(52) U.S. Cl.
CPC .......... *G06F 9/44505* (2013.01); *G06F 9/451* (2018.02); *G06F 9/505* (2013.01); *G06F 9/5027* (2013.01); *G06F 9/541* (2013.01); *G06F 11/3428* (2013.01); *G06F 11/3433* (2013.01); *G06F 11/3495* (2013.01)

(58) Field of Classification Search
CPC ........ G06F 9/5027; G06F 9/505; G06F 9/541; G06F 11/3428; G06F 11/3433; G06F 11/3495
See application file for complete search history.

(56) References Cited

U.S. PATENT DOCUMENTS

| | | |
|---|---|---|
| 2006/0171244 A1 | 8/2006 | Ando |
| 2006/0212923 A1 | 9/2006 | Soneira |
| 2011/0258413 A1 | 10/2011 | Cho et al. |
| 2014/0304490 A1 | 10/2014 | Toyama et al. |
| 2014/0344469 A1 | 11/2014 | Nicholls |
| 2015/0286820 A1 | 10/2015 | Sridhara et al. |
| 2016/0004564 A1 | 1/2016 | Park et al. |
| 2016/0365123 A1 | 12/2016 | Wang et al. |
| 2016/0378578 A1* | 12/2016 | Nandakumar ...... G06F 9/44526 719/328 |
| 2017/0024001 A1 | 1/2017 | Hum et al. |
| 2017/0182416 A1 | 6/2017 | Lee et al. |
| 2017/0339196 A1 | 11/2017 | Lewis et al. |

FOREIGN PATENT DOCUMENTS

| | | |
|---|---|---|
| CN | 101901207 A | 12/2010 |
| CN | 102325255 A | 1/2012 |
| CN | 103365718 A | 10/2013 |
| CN | 105045713 A | 11/2015 |
| CN | 105094283 A | 11/2015 |
| CN | 105607895 A | 5/2016 |
| CN | 107479894 A | 12/2017 |
| CN | 107515787 A | 12/2017 |
| CN | 107577532 A | 1/2018 |
| CN | 107577533 A | 1/2018 |
| CN | 107613107 A | 1/2018 |
| CN | 108536538 A | 9/2018 |
| JP | 2013501298 A | 1/2013 |
| KR | 20080098416 A | 11/2008 |
| KR | 20100138954 A | 12/2010 |
| KR | 20130121412 A | 11/2013 |
| KR | 20160027541 A | 3/2016 |

OTHER PUBLICATIONS

OA with English translation for CN application 201810362695.6 mailed Oct. 27, 2020.
Chinese Office Action with English Translation for CN Application 201810277067.8, dated Jul. 14, 2022. (54 pages).
U.S. Notice Of Allowance for U.S. Appl. No. 17/006,275 dated Sep. 22, 2022. (6 pages).
Chinese Notification to Grant Patent Right for Invention with English Translation for CN Application 201810290670.X, dated Oct. 17, 2022. (8 pages).
Korean Notice of Allowance with English Translation for KR Application 1020207032552 dated Sep. 6, 2022. (4 pages).
Extended European Search Report for EP Application 19788902.5 dated Apr. 12, 2021. (11 pages).
Chinese Office Action with English Translation for CN Application 201810362695.6 dated May 7, 2021. (15 pages).
Yuxia Cheng et al., A User-Level NUMA-Aware Scheduler for Optimizing Virtual Machine Performance, College of Computer Science and Technology, 2013, 32-46 pages.
Syunichi Nakayama, "Software development technologies required for control system (latter Part) Steady advance in MultiCore Support for OS/tools with successive new technologies", Nikkei Electronics Jun. 2016 (No. 1168) published by Nikkei BP on May 20, 2016, pp. 79-89.
Kazuhisa Ishizaka et al., "Core Assignment for Heterogeneous Many-core Processors", Proceedings of the 2011 IEICE (Institute of Electronics, Information and Communication Engineers) General Conference, Divided Edition: Information/System 1, published on Feb. 28, 2011, 1349-1369 pages.
Managing Process Affinity in Linux, https://www.glennklockwood.com/hpc-howtos/process-affinity.html, last modified Oct. 2019, 6 pages.
Luca Lugini, et al., "Online Thread Assignment for Heterogeneous Multicore Systems", Proceedings of the 41st International Conference on Parallel Processing Workshops, IEEE, Sep. 13, 2019, 538-544 pages.
Yuki Ohno et al., Optimal Resource Assignment by Process Behavior Prediction, SIPJ (Information Processing Society of Japan) Technical Report, [CD-ROM], vol. 2010-OS-114, No. 5, the Institute of Information Processing Society of Japan, published on Jun. 15, 2010, pp. 1-10.
Harada Toyoshi, "System Development for Windows CE", Automation, vol. 45, No. 6, published by Japan Industrial Publishing Co., Ltd, on Jun. 1, 2000, pp. 81-87.
Sei Bisuta Gakuen, "Assigning a specific core for software processing", Weekly Ascii, published by Ascii Media Works, vol. 724, Feb. 24, 2009, 10 pages.
Australian Examination Report for AU Application 2019256257 dated Sep. 30, 2021. (6 pages).
Indian Examination Report for IN Application 202017047232 dated Dec. 7, 2021. (6 pages).
Japanese Notice of Reasons for Refusal with English Translation for JP Application 2020558002 dated Dec. 10, 2021. (18 pages).
Korean Office Action with English Translation for KR Application 1020207032552 dated Jun. 7, 2022. (9 pages).
Communication pursuant to Article 94(3) EPC for EP Application 19788902.5 dated Jun. 9, 2022. (8 pages).
China Office Action and English translation for CN application 201810362695.6 dated Jun. 1, 2020.
ISR and English translation for PCT application PCT/CN2019/083520 dated May 29, 2019.
Summons to attend oral proceedings pursuant to Rule 115(1) EPC for EP Application 19788902.5 dated Aug. 17, 2023. (10 pages).

* cited by examiner

METHOD AND APPARATUS FOR SCHEDULING PROCESSOR CORE, AND STORAGE MEDIUM

CROSS-REFERENCE TO RELATED APPLICATION(S)

This application a continuation application of PCT Application No. PCT/CN2019/083520, filed on Apr. 19, 2019, which claims priority to Chinese Patent Application No. 201810362695.6, filed on Apr. 20, 2019, the entire contents of both of which are incorporated herein by reference.

TECHNICAL FIELD

Embodiments of the present disclosure relate to a field of terminal technologies, and more particularly to a method and an apparatus for scheduling a processor core, and a storage medium.

BACKGROUND

With continuous improvement of a processor manufacturing technology, more and more manufacturers configure a processor with a plurality of cores for a terminal to improve an overall processing capacity of the terminal.

Considering a performance and power consumption, the processor with the plurality of cores employs a big-little architecture. The processor employing the big-little architecture includes a plurality of high performance cores and a plurality of low performance cores. The high performance core is configured to process a complex operation while the low performance core is configured to process a simple operation. However, there is not provided a reasonable method for scheduling the processor core in the related art.

SUMMARY

Embodiments of the present disclosure provide a method and an apparatus for scheduling a processor core, and a storage medium.

In embodiments of the present disclosure, a method for scheduling a processor core is provided. The method is applied to a terminal. A processor in the terminal includes at least one first performance core and at least one second performance core, a performance of the first performance core is higher than a performance of the second performance core, and an operating system and at least one application run on the terminal. The method includes: sending, by a target application, a target request to the operating system by calling a first application programming interface (API) provided by an embedded software development kit (SDK), the target request being used to indicate the operating system to feed back core information of the processor, and the core information including a configuration condition of the first performance core and the second performance core; feeding back, by the operating system, the core information to the target application; and scheduling, by the target application, a target core to operate a process of the target application in a system calling way based on the core information.

In embodiments of the present disclosure, an apparatus for scheduling a processor core is provided. The apparatus is applied to a terminal. A processor in the terminal includes at least one first performance core and at least one second performance core, a performance of the first performance core is higher than a performance of the second performance core, and an operating system and at least one application run on the terminal. The apparatus includes: one or more processors, a memory storing instructions executable by the one or more processors, in which the one or more processors are configured to: send a target request to the operating system by calling a first application programming interface (API) provided by an embedded software development kit (SDK). The target request is used to indicate the operating system to feed back core information of the processor, and the core information includes a configuration condition of the first performance core and the second performance core. The one or more processors are also configured to: feed back the core information to the target application. The one or more processors are also configured to: schedule a target core to operate a process of the target application in a system calling way based on the core information.

In embodiments of the present disclosure, a computer readable storage medium is provided. The storage medium stores at least one instruction, and when the at least one instruction is executed by the processor, the processor is caused to perform a method for scheduling a processor core according to embodiments of the present disclosure. The method includes: sending, by a target application, a target request to the operating system by calling a first application programming interface (API) provided by an embedded software development kit (SDK), the target request being used to indicate the operating system to feed back core information of the processor, and the core information including a configuration condition of the first performance core and the second performance core; feeding back, by the operating system, the core information to the target application; and scheduling, by the target application, a target core to operate a process of the target application in a system calling way based on the core information.

DETAILED DESCRIPTION

In order to enable the objective, technical solutions and advantages of the present disclosure clearer, a further description will be made in detail below to embodiments of the present disclosure with reference to accompanying drawings.

A term herein "plurality" refers to two or more. Terms "and/or" describe an association relationship of associated objects, representing that there may be three kinds of relationships. For example, A and/or B may represent three cases, that is, A alone, A and B simultaneously, and B alone. The character "/" generally represents that context objects are an "or" relationship.

Figure 1:
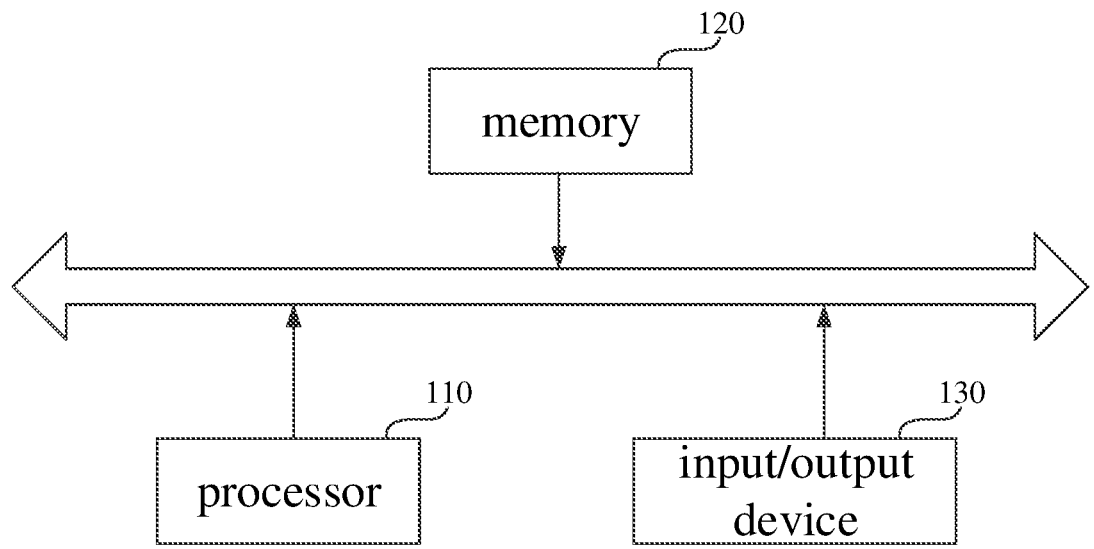
FIG. 1 is a block diagram illustrating a terminal according to an example embodiment of the present disclosure.

Please refer to FIG. 1, a block diagram illustrating a terminal 100 according to an example embodiment of the present disclosure is illustrated. The terminal 100 may be an electronic device capable of operating an application, such as a smart phone, a tablet, or an electronic book. The terminal 100 in the present disclosure may include one or more of a processor 110, a memory 120, and an input/output device 130.

The processor 110 may include one or more processing cores. The processor 110 couples to respective parts in the entire terminal 100 by utilizing respective interfaces and lines, and performs respective functions and processing data of the terminal 100 by operating or executing instructions, a program, a code set or an instruction set stored in the memory 120 and calling data stored in the memory 120. Alternatively, the processor 110 may be implemented in at least one hardware form of a digital signal processing (DSP), a field-programmable gate array (FPGA), and a programmable logic array (PLA). The processor 110 may integrate one or more combination of a central processing unit (CPU), a graphics processing unit (GPU), a modem, and the like. The CPU mainly processes an operating system, a user interface, an application and the like. The GPU is responsible for rendering and drawing display content. The modem is configured to process wireless communications. It may be understood that the above modem may also be implemented alone by a communication chip without being integrated into the processor 110.

In embodiments of the present disclosure, the CPU integrated in the processor 110 includes at least two cores. The at least two cores include at least one first performance core (high performance core) and at least one second performance core (low performance core). A processing capacity of a single first performance core is greater than that of a single second performance core. For example, the CPU includes eight cores, in which four cores are the first performance cores and the other four cores are the second performance cores.

Alternatively, an operating frequency of the first performance core is greater than that of the second performance core, and a power consumption of the first performance core is greater than that of the second performance core. For example, the operating frequency of the first performance core is 2.0 GHz, and the operating frequency of the second performance core is 1.2 GHz. Embodiments of the present disclosure do not limit the operating frequencies of the two processor cores.

The memory 120 may include a random access memory (RAM) or a read-only memory. Alternatively, the memory 120 includes a non-transitory computer-readable storage medium. The memory 120 may be configured to store the instructions, the program, the codes, the code set, or the instruction set. The memory 120 may include a storage program area and a storage data area. The storage program area may store instructions for implementing the operating system, instructions for implementing at least one function (such as a touch function, a sound playing function, an image playing function, etc.), instructions for implementing each method embodiment described below, etc. The operating system may be an Android system (including a system developed in depth based on the Android system), an IOS system developed by Apple (including a system developed in depth based on the IOS system), or other system. The storage data area may also store data (such as a phone book, audio and video data, chat record data) created by the terminal 100 in use.

The memory 120 may be divided into an operating system space and a user space. The operating system operates in the operating system space, and a native application and a third-party application operate in the user space. In order to ensure that different third-party applications may achieve a better operation effect, the operating system allocates corresponding system resources to different third-party applications. However, different application scenarios in the same third-party application also have different requirements for the system resources. For example, in a local resource load scenario, the third-party application has a high requirement on a disk reading speed, and in an animation rendering scenario, the third-party application has a high requirement on a performance of the GPU. However, the operating system and the third-party application are independent of each other, and the operating system often may not sense a current application scenario of the third-party application in time, causing that the operating system may not perform a targeted system resource adaptation based on a detailed application scenario of the third-party application.

In addition, an operation quality of the third-party application is also related to a real-time operation state of the operating system. When the third-party application may not obtain a current operation state of the operating system in time, the operation quality of the third-party application may also be affected. For example, when a terminal temperature is too high, the third-party application may still operate in a first performance mode, continued increase temperature in the terminal may cause a breakdown of the system, and the third-party application may also not operate.

Figure 2:
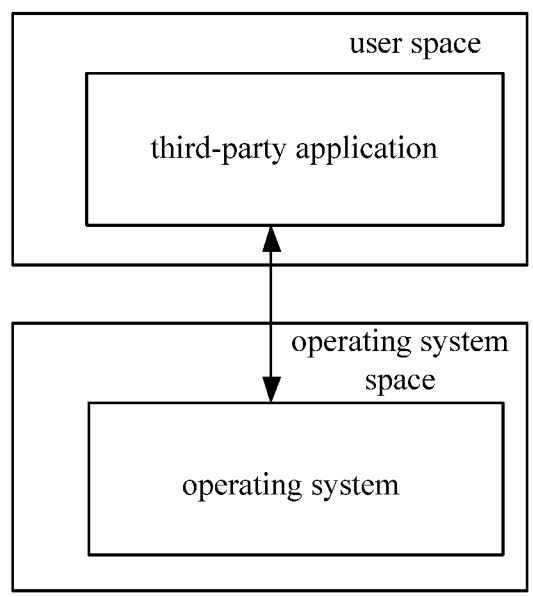
FIG. 2 is a schematic diagram illustrating a procedure for an application communicating with an operating system in a terminal.

As illustrated in FIG. 2, in order to improve the operation quality of the third-party application, it is necessary to establish a data communication between the third-party application and the operating system, such that the operating system may obtain current scenario information of the third-party application at any time, and then perform the targeted system resource adaptation based on a current scenario. At the same time, the third-party application may obtain the operation state of the operating system in real time, and then perform a targeted program optimization based on the operation state.

Figure 3:
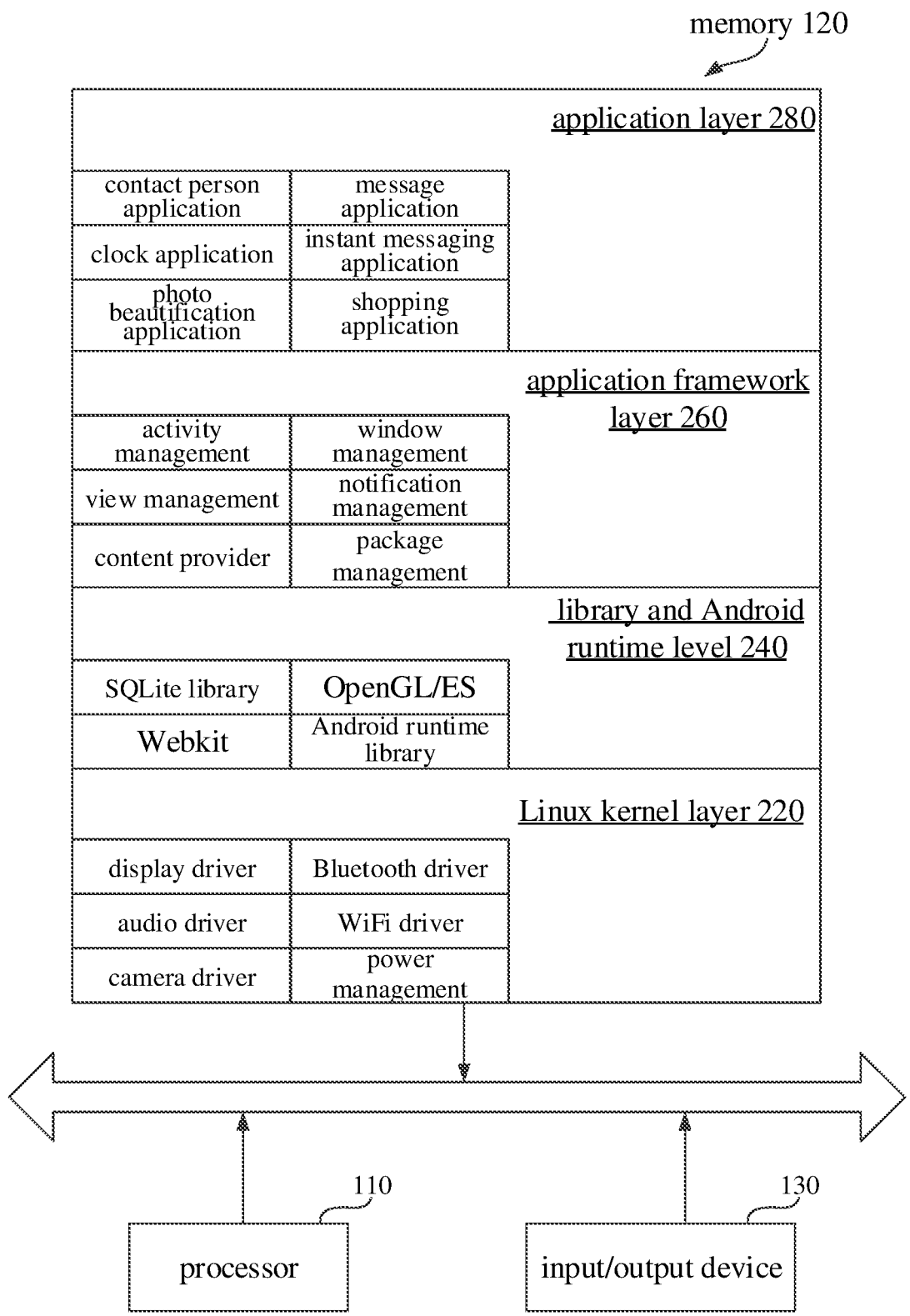
FIG. 3 is a block diagram illustrating a terminal according to an example embodiment of the present disclosure.

Taking the operating system being the Android system as an example, a program and data stored in the memory 120 are illustrated in FIG. 3. The memory 120 may store a Linux kernel layer 220, a library and Android runtime level 240, an application framework layer 260 and an application layer 280. The Linux kernel layer 220, the library and Android runtime level 240 and the application framework layer 260 belong to the operating system space, and the application layer 280 belongs to the user space. The Linux kernel layer 220 provides underlying driver for respective hardware of the terminal 100, such as display driver, audio driver, camera driver, Bluetooth driver, WiFi driver, power management, etc. The library and Android runtime level 240 provides main feature support for the Android system through some C/C++ libraries. For example, a SQLite library provides database support, an OpenGL/ES library provides 3D drawing support, a Webkit library provides browser kernel support, etc. In the library and Android runtime level 240, an Android runtime library is also provided, which mainly provides some core libraries and may allow a developer to write an Android application by using Java language. The application framework layer 260 provides respective APIs that may be used when constructing the application. The developer may also use these APIs to construct the application, such as activity management, window management, view management, notification management, content provider, package management, call management, resource management, and location management. At least one application is operated in the application layer 280. The at least one application may be the native application built into the operating system, such as a contact person application, a message application, a clock application, a camera application, etc., or may also be the third-party application developed by a third-party developer, such as a game application, an instant messaging application, a photo beautification application, a shopping application, etc.

Figure 4:
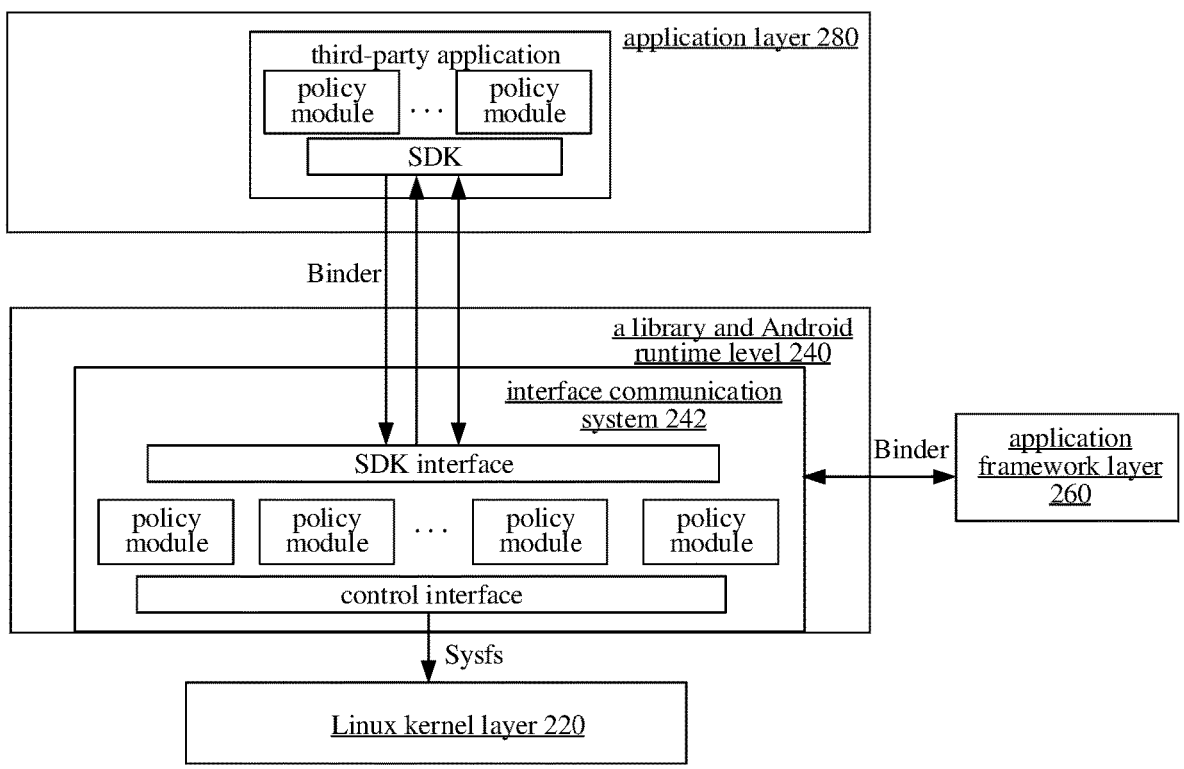
FIG. 4 and FIG. 5 are schematic diagrams illustrating a procedure for an application communicating with an operating system in a terminal illustrated in FIG. 3.

A feasible communication method between the operating system and the third-party application is illustrated in FIG. 4. An SDK (software development kit) for communicating with the operating system is embedded in the third-party application.

The SDK includes some abstracted APIs. The abstracted APIs are provided to a developer of the third-party application by a developer of the operating system and embedded into the third-party application by the developer of the third-party application. After such third-party application is installed and operated on the operating system, the API provided by the SDK may be called to communicate with the operating system.

As illustrated in FIG. 4, a library and Android runtime level 240 may additionally include an interface communication system 242. The interface communication system 242 may be regarded as a subsystem in the operating system or as an application embedded in the operating system. The interface communication system 242 is disposed with an SDK interface, and a third-party application calls the API embedded in an SDK to perform data communication with the SDK interface in a binder way. In this way, data related to an application scenario of the third-party application may be transmitted to the operating system through the SDK, and/or the data related to the operation state of the operating system may also be transmitted to the third-party application through the SDK.

Figure 5:
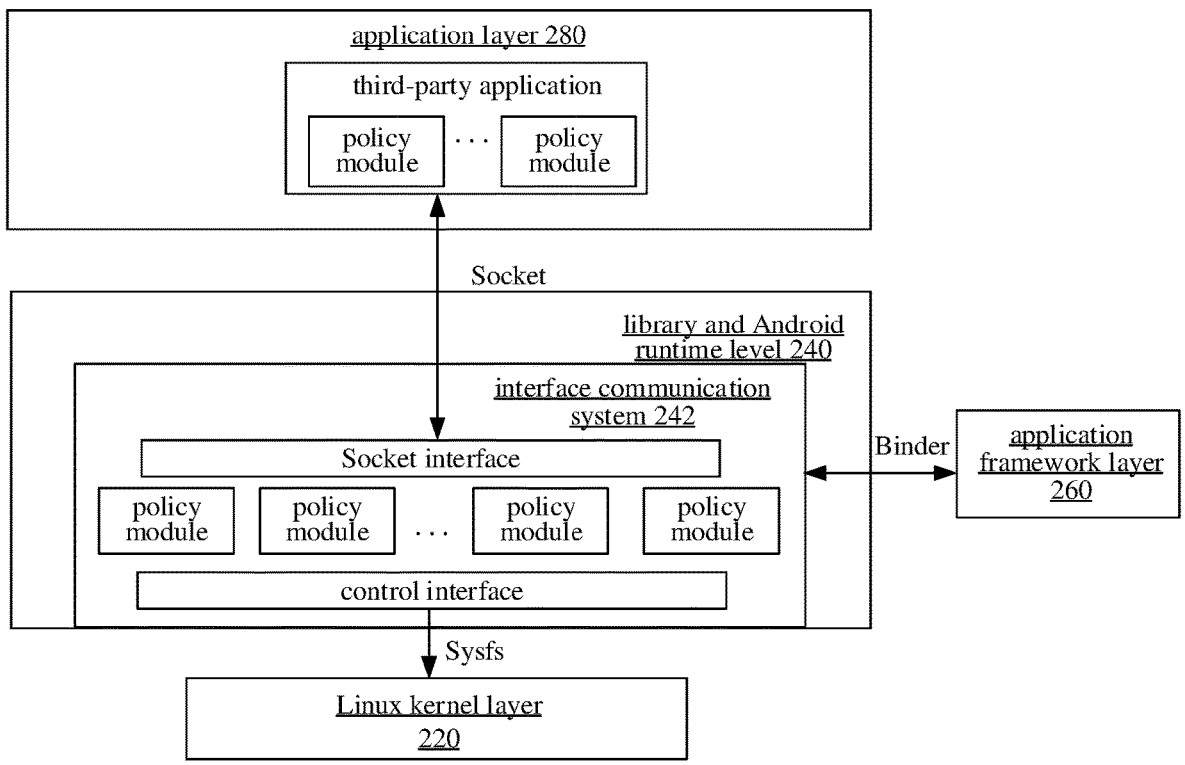

In another feasible communication mode, as illustrated in FIG. 5, the third-party application may also establish a long connection with a socket interface of the interface communication system 242 in a socket way. The third-party application and the operating system may communicate through the long connection.

As illustrated in FIG. 4 and FIG. 5, the interface communication system 242 may be disposed with different policy modules. After the data sent by the third-party application is received, the interface communication system 242 analyzes the data by employing a policy module corresponding to the third-party application to obtain a corresponding resource adaptation optimization strategy. Based on the analyzed resource adaptation optimization strategy, the interface communication system 242 notifies the Linux kernel layer 220 through a control interface to perform adaptation optimization for system resources. The control interface may communicate with the Linux kernel layer 220 in a Sysfs way.

Alternatively, different policy modules in the interface communication system 242 may correspond to different third-party applications (i.e. setting policy modules for different applications), or, different policy modules may correspond to different types of third-party applications (i.e. setting policy modules for different types of applications), or, different policy modules may correspond to different system resources (i.e. setting policy modules for different system resources), or different policy modules may correspond to different application scenarios (i.e. setting policy modules for different application scenarios). Embodiments of the present disclosure do not limit the detailed setting way for the policy module.

Alternatively, as illustrated in FIG. 4 or 5, different policy modules may be disposed in the third-party application. After the data related to the operating state sent by the operating system is received, the third-party application program may formulate different program optimization policies through different policy modules, and then optimize the application based on the program optimization policy.

The interface communication system 242 may also communicate with the application framework layer 260 in the Binder manner, and be configured to receive foreground application information sent by the application framework layer 260, thereby optimizing the system resource only for the third-party application currently operating in the foreground based on the foreground application information.

Figure 6:
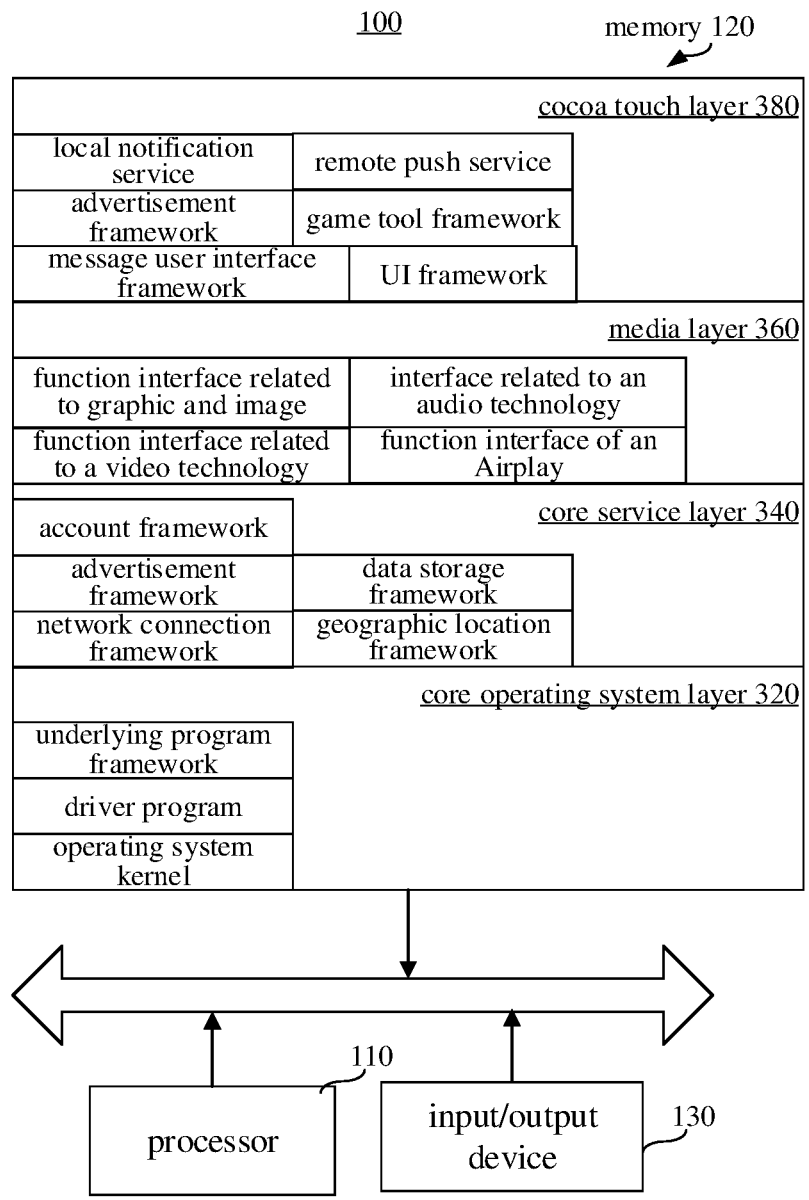
FIG. 6 is a block diagram illustrating a terminal according to another example embodiment of the present disclosure.

Taking the operating system being the IOS system as an example, programs and data stored in the memory 120 are illustrated in FIG. 6. the IOS system includes a core operating system layer 320, a core services layer 340, a media layer 360, and a cocoa touch layer 380. The core operating system layer 320 includes an operating system kernel, a driver program, and an underlying program framework. The underlying program framework provides a function closer to hardware for use by the program framework located at the core service layer 340. The core service layer 340 provides a system service and/or a program framework required by the application, such as a foundation framework, an account framework, an advertisement framework, a data storage framework, a network connection framework, a geographic location framework, a motion framework, and the like. The media layer 360 provides an audio-visual interface for the application, such as an interface related to a graphic and an image, an interface related to an audio technology, an interface related to a video technology, and an airplay interface related to an audio-video transmission technology. The cocoa touch layer 380 provides frameworks related to respective common surfaces for application development. The cocoa touch layer 380 is responsible for a touch interaction operation of the user on the terminal 100. The frameworks may be a local notification service, a remote push service, an advertisement framework, a game tool framework, a message user interface (UI) framework, a user interface UIKit framework, a map framework, etc.

In the frameworks illustrated in FIG. 6, frameworks related to most applications include, but are not limited to, a basic framework in the core service layer 340 and a UIKit framework in the cocoa touch layer 380. The basic framework provides a plurality of basic object classes and data types for providing a most basic system service for all the applications, regardless of the UI. The class provided by the UIKit framework is a basic UI class library for creating a touch-based user interface. An IOS application may provide a UI based on the UIKit framework. Therefore, the UIKit framework provides an infrastructure of the application for constructing the user interface, drawing and handling an interaction event with the user, and responding to a gesture.

The method and the principle of implementing data communication between the third-party application and the operating system in the IOS system may be referred to the Android system, which may not be elaborated here in the present disclosure.

The input/output device 130 may include a touch display screen. The touch display screen is configured to receive a touch operation by the user using any suitable object such as a finger, a touch pen or the like on or near it, and to display the user interfaces of respective applications. The touch display screen is generally provided on a front panel of the terminal 100. The touch display screen may be designed as a full screen, a curved screen or a special-shaped screen. The touch display screen may also be designed as a combination of the full screen and the curved screen, and a combination of the special-shaped screen and the curved screen, which is not limited by embodiments of the present disclosure.

In addition, the skilled in the art may understand that, a structure of the terminal 100 illustrated in the above accompanying drawings does not constitute a limitation on the terminal 100, and the terminal may include more or fewer components than the accompanying drawings, combine some components, or arrange different components. For example, the terminal 100 also includes components such as a radio frequency circuit, an input unit, a sensor, an audio circuit, a wireless fidelity (WiFi) module, a power supply, a Bluetooth module, and the like, which may not be described in detail here.

In the related art, the work for scheduling the processor core is independently completed by a scheduler based on a current load situation. For example, when it is detected that a load of the low performance core is large, the scheduler may schedule a high performance core to operate a process, and when it is detected that a load of the high performance core is small, the scheduler may schedule the low performance core to operate the process.

However, there is a delay for scheduling a processor core based on the load. In a possible scenario, when a process of a certain application is temporarily idle, the scheduler may schedule the low performance core to operate the process due to a small load at this time. However, when the process enters a busy state again, the scheduler may schedule the processor core only when it is detected that the load is large, thus the processor core may not be scheduled in time. However, the processor core may not be scheduled in time, thereby causing the application to jam and affecting an operation quality of the application.

In order to avoid the above problems, in embodiments of the present disclosure, the application performs data communication with the operating system through the API provided by the embedded SDK, and obtains core information of the processor from the operating system, thereby implementing dynamic scheduling for the processor core in a system calling way based on the core information and a requirement of the process of the application on the performance of the processor. Compared with scheduling the processor core based on the load, the method according to embodiments of the present disclosure may avoid lagging of core scheduling, improve a timeliness of core scheduling, further avoid the problem occurred by the application such as jam, and improve an operation smoothness of the application.

Figure 7:
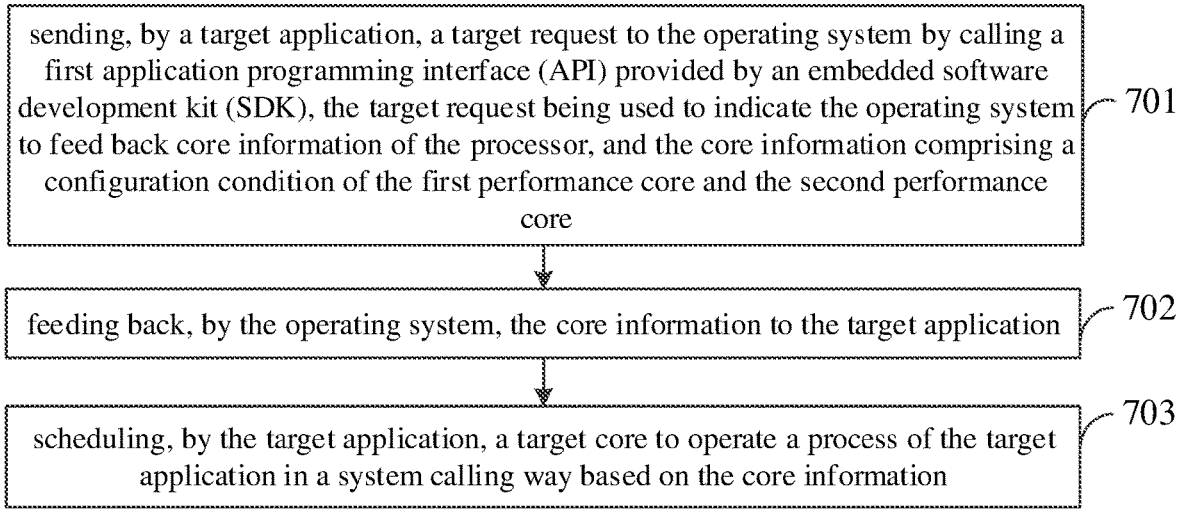
FIG. 7 is a flow chart illustrating a method for scheduling a processor core according to an example embodiment of the present disclosure.

Please refer to FIG. 7, which is a flow chart illustrating a method for scheduling a core of a processor according to an example embodiment of the present disclosure. This embodiment is illustrated by applying the method to a terminal 100 having an operating system and at least one application operated thereon. The method includes the followings.

At block 701, a target application sends a target request to the operating system by calling a first application programming interface (API) provided by an embedded software development kit (SDK). The target request is used to indicate the operating system to feed back core information of the processor, and the core information includes a configuration condition of the first performance core and the second performance core.

The target application may be a third-party application embedded with the SDK provided by a developer of the operating system. The target application may be a game application, a video playing application, an instant messaging application, etc. Embodiments of the present disclosure do not specifically limit the target application.

The embedded SDK includes a plurality of APIs. When the target application is started completely, the target application establishes a Binder connection with the operating system by calling the first API provided by the embedded SDK, thereby establishing a data communication connection with the operating system through the Binder connection. Furthermore, through the data communication connection, the target application sends the target request to the operating system, to indicate the operating system to feed back the core information of the processor.

The core information at least includes information indicating a processor core architecture. Alternatively, the core information includes a core type and a core number corresponding to each core (processor core). The core type includes the first performance core and the second performance core. For example, the core information indicates that the four processor cores with core numbers 0-3 are the first performance cores while the four processor cores with core numbers 4-7 are the second performance cores.

The processor core architecture may not change. Therefore, in a possible implementation, after the target application obtains the core information for the first time, the information indicating the processor core architecture in the core information is stored. The target application may then directly obtain the processor core architecture.

At block 702, the operating system feeds back the core information to the target application.

Correspondingly, the operating system feeds back the core information through the data communication connection with the target application.

A plurality of applications embedded the SDK may be installed and operate in the terminal, and the operating system may establish data communication connection with the plurality of applications at the same time. In order to ensure an operation quality of a foreground application, in one possible implementation, the operating system obtains a foreground application identifier of the foreground application, and detects whether an application identifier of the target application is consistent with the foreground application identifier. For example, as illustrated in FIG. 4, a Binder connection is established between an application framework layer 260 and an interface communication system 242. The operating system obtains foreground application information from the application framework layer 260, and the foreground application information includes the foreground application identifier.

The operating system may feed back the core information to the target application under a case that the application identifier is consistent with the foreground application identifier. The operating system may not feed back the core information to the target application under a case that the application identifier is not consistent with the foreground application identifier.

In order to avoid that an illegal application obtains the core information of the processor of the terminal to cause a potential safety hazard, in a possible implementation, after the target request is received, the operating system performs the following steps.

At step one, the operating system obtains the application identifier of the target application.

At step two, under a case that the application identifier of the target application belongs to a preset application identifier list, the operating system feeds back the core information to the target application, and the preset application identifier list includes the application identifier of the application for supporting core scheduling.

Alternatively, a list of the application identifier is preset in the operating system, and the preset application identifier list includes the application identifier of the application for supporting the processor to perform core scheduling. Alternatively, the preset list is set by a developer of the operating system, and encrypted and stored in the terminal.

The operating system feeds back the core information to the target application under a case that the application identifier of the target application belongs to the preset application identifier list.

At step three, the operating system does not respond to the target request under a case that the application identifier of the target application does not belong the preset application identifier list.

The operating system may not respond to the target request, i.e. may not feed back the core information to the target application, under the case that the application identifier of the target application does not belong to the preset application identifier list.

Alternatively, when the application identifier of the target application does not belong to the preset application identifier list, the operating system disconnects the connection with the target application.

It should be noted that, detecting whether the target application belongs to the preset list of the application identification may also be performed when the data communication connection is established with the target application, which is not limited thereto.

Alternatively, the operating system sends the core information in form of a data packet, and the form of the data packet is agreed with the operating system in advance. The form of the data packet may be a JavaScript object notation (JSON), a protocol buffer (protobuf) or a custom format.

At block 703, the target application schedules a target core to operate a process of the target application in a system calling way based on the core information.

Correspondingly, the target application analyzes the data packet in a preset data packet format after receiving the data packet sent by the operating system, to obtain the core information included in the data packet.

Alternatively, the target application schedules a corresponding core to operate the process of the target application based on the core information and a requirement of the process of the target application for a processing performance. Since the scheduling for the processor core is finally controlled by the operating system, the target application indirectly implements the scheduling for the processor core in the system calling way.

The target core is at least one core in the first performance cores or at least one core in the second performance cores.

Alternatively, the number of target cores has a positive correlation with the number of threads in the process, and associated threads operate on a same target core, thereby sharing context information on the target core and improving the operating efficiency.

In a possible implementation, when a requirement of the process of the target application for the processing performance is greater than the performance threshold, the target application schedules the first performance core to operate the process of the target application. When the requirement of the target application for the process performance is lower than the performance threshold, the target application schedules the second performance core to operate the process of the target application, to reduce the overall power consumption.

Alternatively, since the application in a background operation state has a lower requirement on an operation performance, in order to reduce the power consumption, when a foreground operation is switched to a background operation, the target application schedules the second performance core to operate the process in the system calling way.

In conclusion, in the method for scheduling the processor core according to embodiments of the present disclosure, by embedding the SDK in the target application, the target application may call the API interface provided by the SDK, obtain the core information of the processor of the terminal from the operating system, and then schedule an appropriate processor core to operate a current process based on the core information. In embodiments of the present disclosure, the target application may adaptively schedule a corresponding processor core to operate the process based on the core information, thereby avoiding a jam problem of the application caused by the untimely scheduling of the operating system, and achieving an effect for optimizing the operation quality of the application.

Alternatively, the core information includes a core type and a core number corresponding to each core. The core type includes the first performance core and the second performance core.

Scheduling, by the target application, the target core to operate the process of the target application in the system calling way based on the core information includes: determining, by the target application, the target core corresponding to the process; setting, by the target application, an affinity degree between the process and each core in the system calling way based on a core number of the target core and a process identifier of the process, in which an affinity degree between the process and the target core is greater than an affinity degree between the process and other core; and binding, by the operating system, the process and the target core based on the affinity degree, in which the bound process operates on the target core.

Alternatively, determining, by the target application, the target core corresponding to the process includes: obtaining, by the target application, a current application scenario; determining, by the target application, the first performance core as the target core under a case that the current application scenario belongs to a first performance application scenario; and determining, by the target application, the second performance core as the target core under a case that the current application scenario belongs to a second performance application scenario. A performance requirement of the first performance application scenario for the processor is greater than a performance requirement of the second performance application scenario for the processor.

Alternatively, the core information also includes load information of each core; and determining, by the target application, the target core corresponding to the process includes: obtaining, by the target application, a current application scenario; determining, by the target application, a load of each core based on the load information; determining, by the target application, the first performance core of which a load is lower than a load threshold as the target core under a case that the current application scenario belongs to a first performance application scenario; and determining, by the target application, the second performance core of which a load is lower than the load threshold as the target core under a case that the current application scenario belongs to a second performance application scenario. A performance requirement of the first performance application scenario for the processor is greater than a performance requirement of the second performance application scenario for the processor.

Alternatively, before sending, by the target application, the target request to the operating system by calling the first API provided by the embedded SDK, the method also includes: sending, by the target application, a scheduling request to the operating system by calling a second API provided by the embedded SDK, the scheduling request being used to indicate the operating system to feed back a difficulty level for operating the target application; feeding back, by the operating system, the difficulty level to the target application; sending, by the target application, the target request to the operating system by calling the first API provided by the embedded SDK under a case that the difficulty level is greater than a preset level threshold; and not performing, by the target application, core scheduling under a case that the difficulty level is lower than the preset level threshold.

In a possible implementation, the target application binds the process with the target core by setting the affinity (or adhesion) of the processor core, thereby implementing to operate the process on the target core. Example embodiments will be employed below for illustrating.

Figure 8:
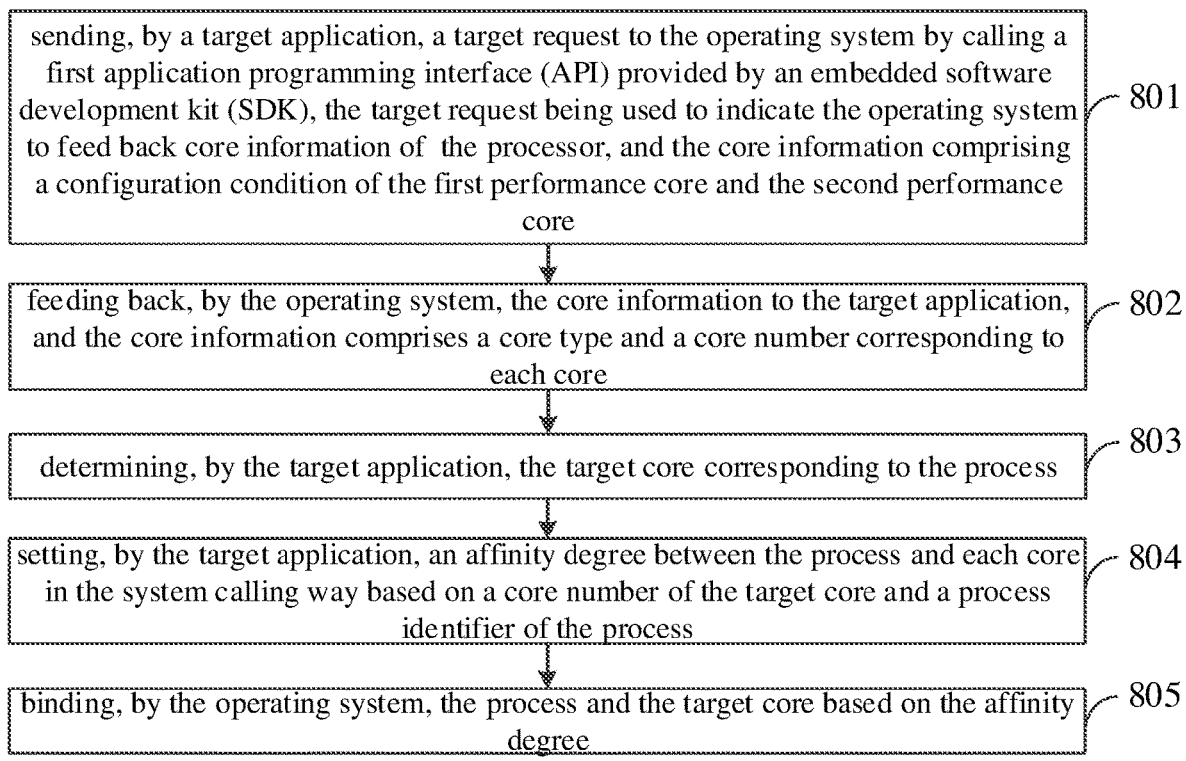
FIG. 8 is a flow chart illustrating a method for scheduling a processor core according to another example embodiment of the present disclosure.

Please refer to FIG. 8, which is a flow chart illustrating a method for scheduling a processor core according to another example embodiment of the present disclosure. This embodiment is illustrated by applying the method to a terminal 100 having an operating system and at least one application operated thereon. The method includes the followings:

At block 801, a target application sends a target request to the operating system by calling a first API provided by an embedded SDK. The target request is used to indicate the operating system to feed back core information of the processor. The core information includes configuration conditions of the first performance core and the second performance core.

The implementation at the block is similar to the above implementation at the block 701, which is not be repeated here in this embodiment.

At block 802, the operating system feeds back the core information to the target application. The core information includes a core type and a core number corresponding to each core.

Processor core architectures employed by different types of processors are different (the number of cores is different and arrangements of high performance cores and low performance cores are different). Therefore, in order to ensure the accuracy of subsequent scheduling, the core information fed back by the operating system includes information indicating the processor core architecture, in which the core type and core number corresponding to each core are included.

Take an 8-core processor as an example, core numbers corresponding to the eight processor cores are 0-7. The core information fed back by the operating system indicates that processor cores with core numbers 0-3 is the first performance cores, and the processor cores with core numbers 4-7 is the second performance cores.

At block 803, the target application determines the target core corresponding to the process.

In a possible implementation, when the target application is in a foreground operation state, the target core corresponding to the process of the target application remains unchanged, that is, the process of the target application always operates in the target core. In order to ensure that the target application may achieve a good operation quality when operating in the foreground, the target application determines the target core based on a maximum processing performance requirement of the process. The maximum processing performance requirement is written into the application in advance by a developer of the application.

For example, when the target application is an application having a lower requirement for an operation capacity of the processor, such as a mail application, a weather application, etc., the target application determines the target core corresponding to the process of the target application as the second performance core because the target application has lower requirements for the operation capacities of the processor in different application scenarios. When the target application is an application having a greater requirement for the operation capacity of the processor, such as an instant messaging application, a game application, a web browsing application, a video playing application, etc., the target application determines the target core corresponding to the process of the target application as the first performance core because the target application has greater requirements for the operation capacities of the processor in some specific application scenarios (such as a game play scenario, a video call scenario, etc.).

However, the same application may have different requirements for the operation capacities of the processor in different application scenarios. For example, taking the game application as an example, in a game main surface scenario, the process has a lower requirement for the operation capacity of the processor, while in a game battle scenario, the process has a greater requirement for the operation capacity of the processor. When the process of the target application always operates on the target core, the computing resource of the processor may be wasted and an overall power consumption of the terminal may be increased.

Figure 9:
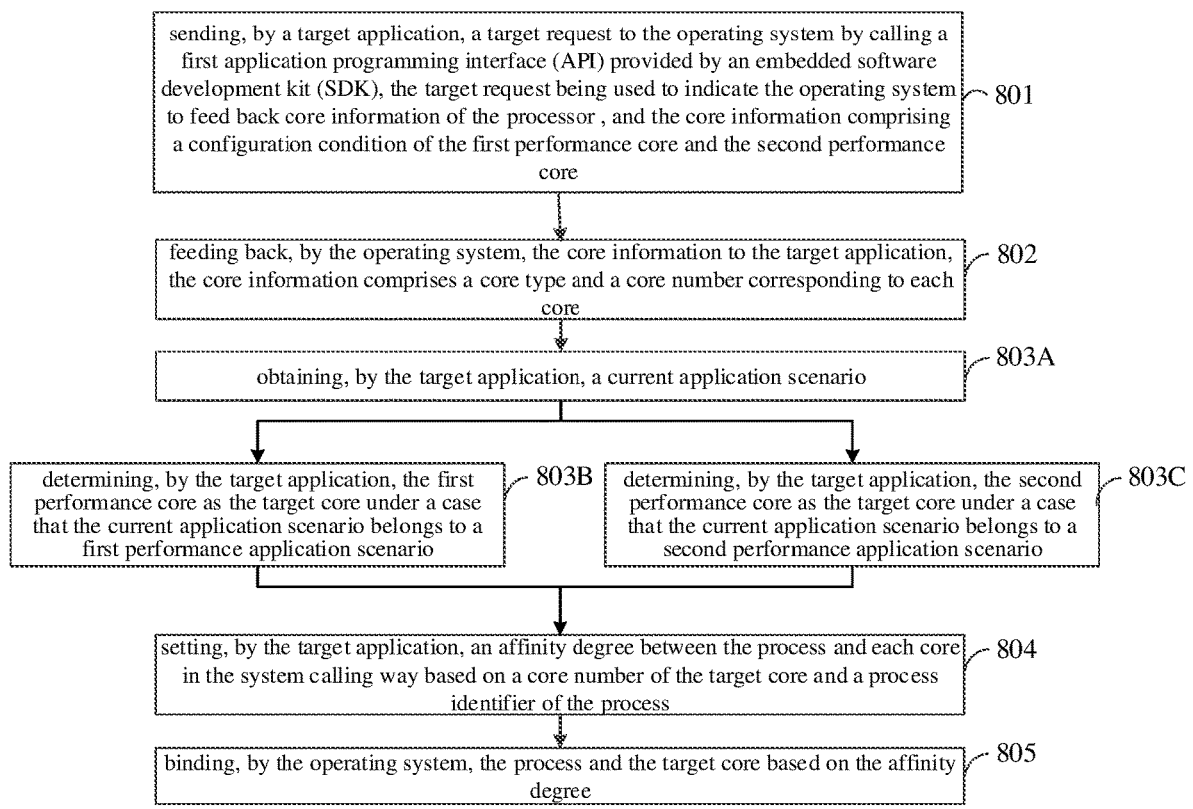
FIG. 9 is a flow chart illustrating a method for scheduling a processor core according to another example embodiment of the present disclosure.

Therefore, in another possible implementation, when the target application is in the foreground operation state, the target application dynamically determines the target core corresponding to the process based on a current application scenario. As illustrated in FIG. 9, following actions may be included.

At block 803A, the target application obtains a current application scenario.

The application scenario refers to scenarios corresponding to different operation stages in the target application. For example, for a game application, the application scenarios include a game data load scenario, a game data updating scenario, a game main interface scenario, a game battle scenario, etc.

Alternatively, when the application scenario changes, the target application obtains the current application scenario. The application scenario is represented by a scene number.

At block 803B, the target application determines the first performance core as the target core under a case that the current application scenario belongs to a first performance application scenario.

Alternatively, when the target application is developed, a developer divides the application scenario into a first performance application scenario and a second performance application scenario based on a requirement of the application scenario for the operation capacity of the processor. The performance requirement of the process for the processor in the first performance application scenario is greater than that of the process in the second performance application scenario.

Taking the game application as an example, the first performance application scenarios corresponding to the game application includes a game mall surface scenario, a game cut scenario and a game battle scenario. The second performance application scenarios corresponding to the game application include a game resource update scenario, a game main surface scenario and a game account login scenario.

Further, the target application detects whether the current application scenario belongs to the first performance application scenario. If the current application scenario belongs to the first performance application scenario, the target application program determines the first performance core as the target core; and if the current application scenario does not belong to the first performance application scenario, the target application determines that the current application scenario belongs to the second performance application scenario.

In combination with the example at block 802, when the current application scenario belongs to the first performance application scenario, the target application determines the first performance cores with core numbers 0 and 1 as the target core.

At block 803C, the target application determines the second performance core as the target core under a case that the current application scenario belongs to a second performance application scenario.

When the current application scenario belongs to the second performance application scenario, in order to reduce power consumption, the target application determines the second performance core as the target core.

In combination with the example at block 802, when the current application scenario belongs to the second performance application scenario, the target application program determines the second performance core with a core number 4 as the target core.

At block 804, the target application sets an affinity degree between the process and each core in the system calling way based on a core number of the target core and a process identifier of the process.

In a possible implementation, the affinity degree between the process and the processor core is represented by a mask. Taking an 8-core processor as an example, the mask is 0xff by default, and converted to binary 11111111, which represents that the process has a same affinity degree with each processor core and may operate on any processor core.

In order to enable the process of the target application to operate on the specified target core, in one possible implementation, the target application utilizes a function provided by the operating system to set the affinity degree between the process and each core (i.e. setting the mask) in the system calling way. An affinity degree between the process and the target core is greater than the affinity degree between the process and other core.

For a way for setting the affinity degree, alternatively, the target application sets the number corresponding to the target core in the mask to be 1 based on the core number of the target core, and sets the number corresponding to other target core in the mask to be 0 to obtain a target mask, and then sets the affinity degree between the process and each core based on the target mask and the process identity (PID) of the process.

For example, when the target cores are the first performance cores with core numbers 2 and 3, the target application generates a target mask which is 0x30 (a corresponding binary is 00110000), thereby setting the affinity degree between the process and the target core based on the target mask and a process identity PID001.

At block 805, the operating system binds the process and the target core based on the affinity degree.

In a possible implementation, the operating system determines the affinity degree between the process and each core based on the target mask, thereby binding the process and the target core.

In combination with the example at block 804, the operating system determines that the core numbers of the target cores are 2 and 3 based on the target mask 0x30, thereby binding the two first performance cores with the process.

The bound process operates on the target core, and the operating system may unbind the target core from the process only when the affinity degree changes.

Alternatively, after the process is bound, only the process of the target application operates on the target core, thereby avoiding the effect of other processes on the processing performance, and improving the operation quality of the target application.

In this embodiment, the target application sets the affinity degree between the process and each core based on the core number of the target core and a process number of the process, such that the operating system binds the process and the target core based on the affinity degree, thereby ensuring that the process operates on the target core, and improving the operation quality of the process.

In addition, the target application dynamically determines the target core based on the current application scenario, thereby reducing the power consumption of the processor under the low performance application scenario while the operation quality under the high performance application scenario is ensured.

Figure 10:
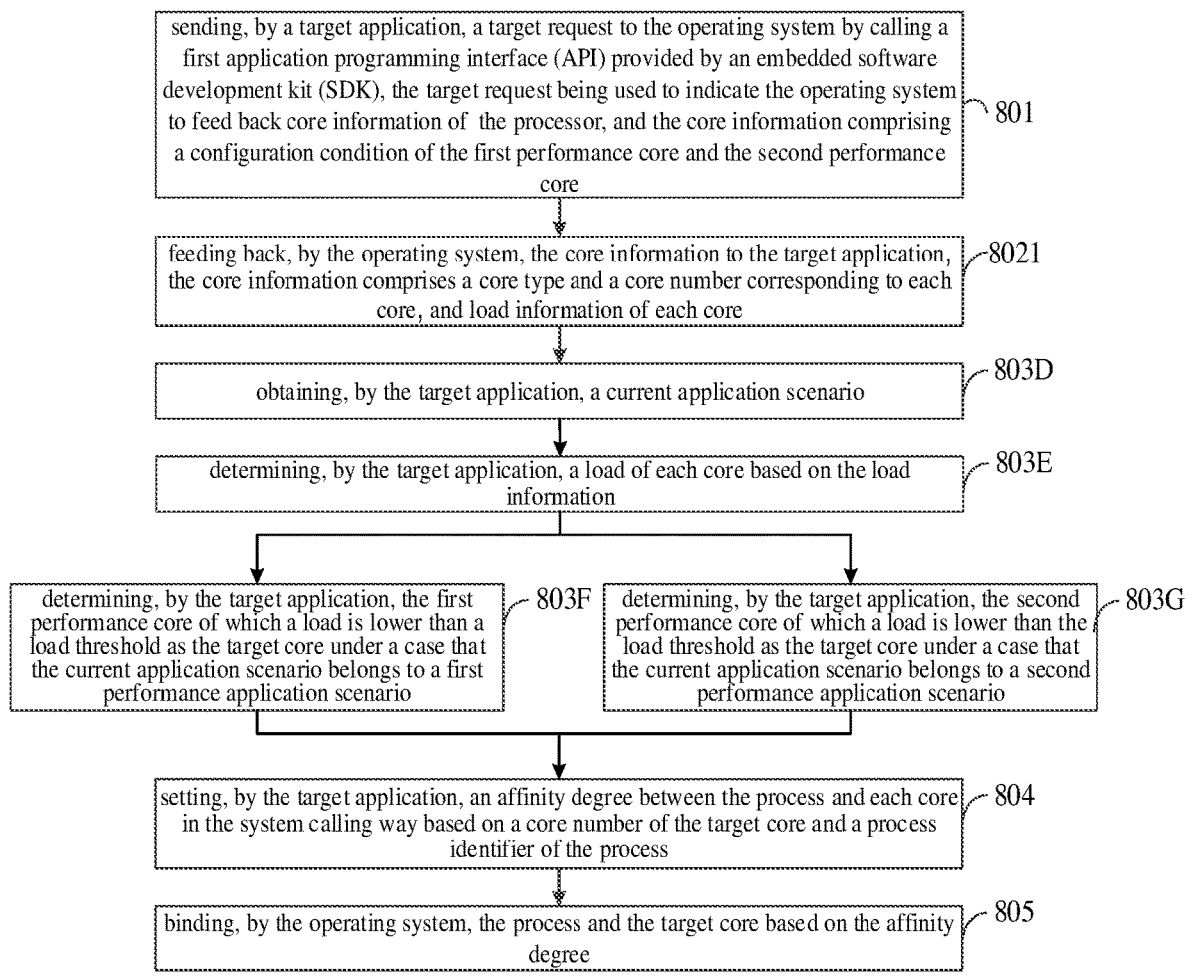
FIG. 10 is a flow chart illustrating a method for scheduling a processor core according to another example embodiment of the present disclosure.

In order to avoid affecting the operation of other processes on the target core when the core is bound for the process, in a possible implementation, the target application determines the target core simultaneously based on the current application scenario and a load condition of the processor core. On the basis of FIG. 9, as illustrated in FIG. 10, actions at block 802 may be replaced by actions at block 8021.

At block 8021, the operating system feeds back the core information to the target application. The core information includes a core type and a core number corresponding to each core, and load information of each core.

Different from actions at block 802, the core information fed back by the operating system may also include current load information of each core. The load information is obtained by the operating system accessing a kernel layer.

Alternatively, the load information includes the load of each core, and the load may be represented by a core usage rate.

Accordingly, actions at blocks 803A to 803C may be replaced by actions at blocks 803D to 803G.

At block 803D, the target application obtains a current application scenario.

The implementation at this block is similar to that at block 803A, which is not repeated in this embodiment.

At block 803E, the target application determines a load of each core based on the load information.

The target application further determines a current load situation of each core after obtaining respective load information.

At block 803F, the target application determines the first performance core of which a load is lower than a load threshold as the target core under a case that the current application scenario belongs to a first performance application scenario.

When the load of the core is large, there are other processes operating on the core. In order to avoid causing greater impact on other processes, the target application determines the target core from the cores of which the loads are lower than the load threshold. For example, the load threshold is 20% of the core usage.

For example, the current application scenario is the first performance application scenario, and the loads of the first performance cores (core numbers are 0 to 3 in turn) are 30%, 22%, 0%, 0% in turn. The target application determines the first performance cores with core numbers 2 and 3 as the target core.

At block 803G, the target application determines the second performance core of which a load is lower than the load threshold as the target core under a case that the current application scenario belongs to a second performance application scenario.

Similar to the actions at block 803F above, when the current application scenario belongs to the second performance application scenario, the target application determines the target core from the second performance core of which the load is lower than the load threshold.

In this embodiment, the target application selects the core with a lighter load as the target core based on the load condition of the core, thereby reducing the impact on other processes when the core is bound.

Figure 11:
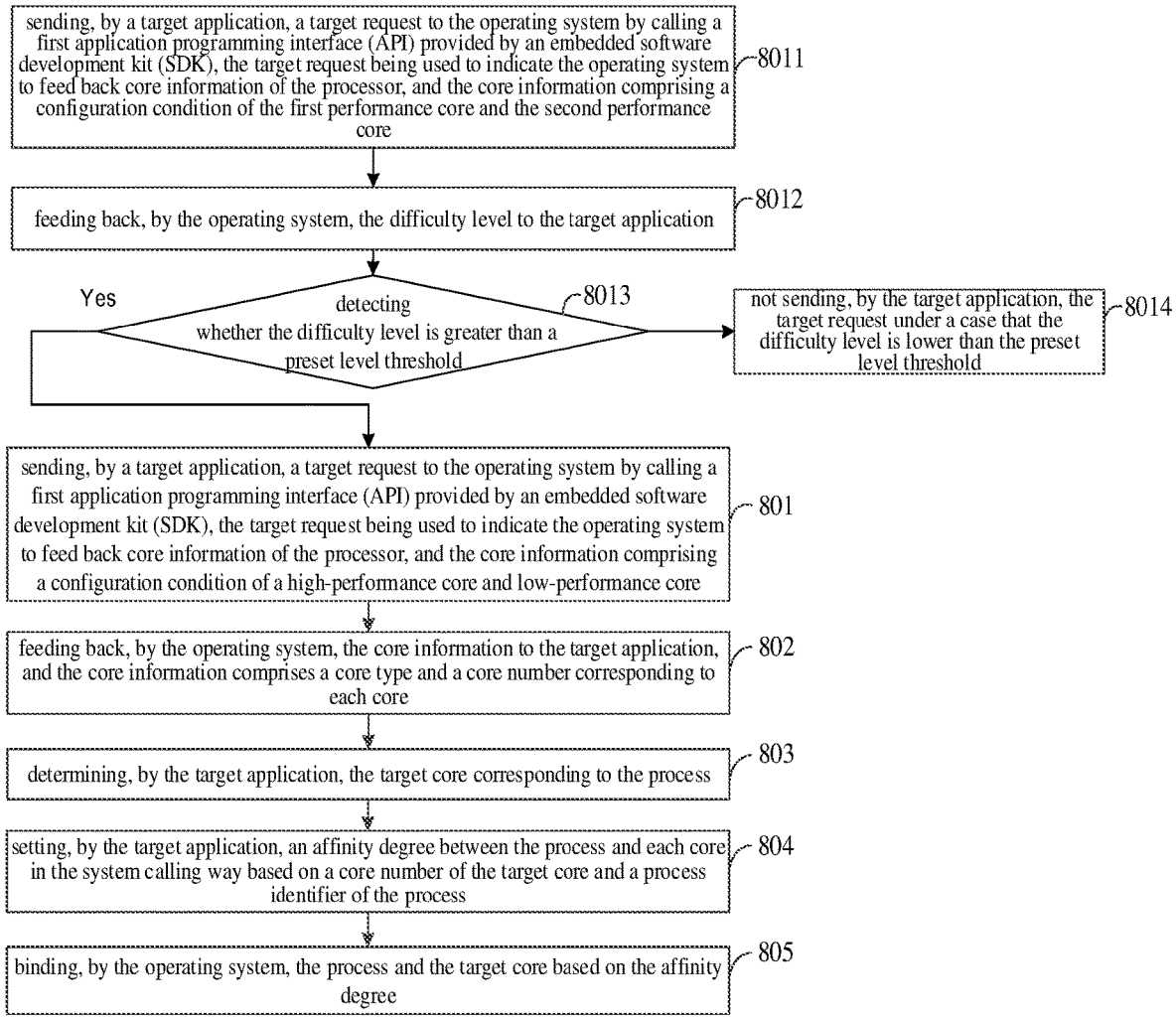
FIG. 11 is a flow chart illustrating a method for scheduling a processor core according to another example embodiment of the present disclosure.

There is a difference in the performances of processor cores of different terminals. Therefore, not all terminals need to employ the above method to schedule the processor core (especially a terminal configured with a high-end processor, whose low performance core may also ensure a common operation of the application). Alternatively, before the processor core is scheduled, the target application judges whether to schedule the processor core based on an operation environment. On the basis of FIG. 8, as illustrated in FIG. 11, following actions are also included before the actions at block 801.

At block 8011, the target application sends a scheduling request to the operating system by calling a second API provided by the embedded SDK. The scheduling request is used to indicate the operating system to feed back a difficulty level for operating the target application.

Similar to sending the target request, the target application sends the scheduling request to the operating system by calling the second API (different from the first API) in the SDK. Alternatively, the scheduling request includes an application identifier. The application identifier may be a package name of the target application.

The difficulty level has a negative correlation with the performance of the processor, that is, the greater the performance of the processor, the lower the difficulty level of operation the target application is.

At block 8012, the operating system feeds back the difficulty level to the target application.

In a possible implementation, corresponding relationships between different applications and difficulty levels are preset in the operating system, and the corresponding relationships are provided by a developer of the operating system and may be dynamically updated.

For example, the corresponding relationships are illustrated in Table 1.

TABLE 1

| Applications | Difficulty levels |
| --- | --- |
| xx weather, xx mailbox | Level 1 |
| xx shopping, xx purchasing tickets | Level 2 |
| xx social contact, xx microblog | Level 3 |
| xx video, xx game | Level 4 |

Accordingly, the operating system determines the corresponding difficulty level based on the application identifier of the target application.

At block 8013, it is detected whether the difficulty level is greater than a preset level threshold.

Further, the target application detects whether the difficulty level is greater than the preset level threshold. When the difficulty level is greater than the preset level threshold, it is determined that the processor core needs to be scheduled and the actions at block 801 are executed. When the difficulty level is lower than the preset level threshold, it is determined that the processor has a strong performance, and actions at block 8014 are executed. In combination with Table 1, the preset level threshold may be Level 2.

At block 8014, the target application does not send the target request under a case that the difficulty level is lower than the preset level threshold.

Alternatively, when core scheduling does not need to be performed, the operating system employs a default mode, i.e. scheduling the processor core based on the load.

Figure 12:
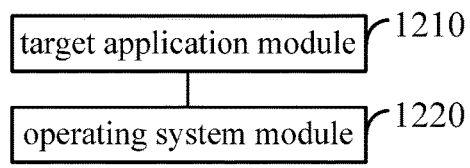
FIG. 12 is a block diagram illustrating an apparatus for scheduling a processor core according to an embodiment of the present disclosure.

Please refer to FIG. 12, which is a block diagram illustrating an apparatus for scheduling a processor core according to an embodiment of the present disclosure. The core scheduling apparatus for the processor may be implemented as all or part of a terminal through software, hardware or a combination thereof. The apparatus includes: a target application module 1210 and an operating system module 1220.

The target application module 1210 is configured to send a target request to the operating system by calling a first application programming interface (API) provided by an embedded software development kit (SDK). The target request is used to indicate the operating system to feed back core information of the processor, and the core information includes configuration conditions of the first performance core and the second performance core.

The operating system module 1210 is configured to feed back the core information to the target application.

The target application module 1210 is configured to schedule a target core to operate a process of the target application in a system calling way based on the core information.

Alternatively, the core information includes a core type and a core number corresponding to each core. The core type includes the first performance core and the second performance core.

The target application module 1210 is configured to: determine the target core corresponding to the process, and set an affinity degree between the process and each core in the system calling way based on a core number of the target core and a process identifier of the process. An affinity degree between the process and the target core is greater than an affinity degree between the process and other core.

The operating system module 1220 is configured to bind the process and the target core based on the affinity degree. The bound process operates on the target core.

Alternatively, the target application module 1210 is also configured to: obtain a current application scenario; determine the first performance core as the target core under a case that the current application scenario belongs to a first performance application scenario; and determine the second performance core as the target core under a case that the current application scenario belongs to a second performance application scenario. A performance requirement of the first performance application scenario for the processor is greater than a performance requirement of the second performance application scenario for the processor.

Alternatively, the core information also includes load information of each core.

The target application module 1210 is also configured to: obtain a current application scenario; determine a load of each core based on the load information; determine the first performance core of which a load is lower than a load threshold as the target core under a case that the current application scenario belongs to a first performance application scenario; and determine the second performance core of which a load is lower than the load threshold as the target core under a case that the current application scenario belongs to a second performance application scenario.

A performance requirement of the first performance application scenario for the processor is greater than a performance requirement of the second performance application scenario for the processor.

Alternatively, the target application module 1210 is also configured to send a scheduling request to the operating system by calling a second API provided by the embedded SDK. The scheduling request is used to indicate the operating system to feed back a difficulty level for operating the target application.

The operating system module 1220 is also configured to feed back the difficulty level to the target application.

The target application module 1210 is also configured to send the target request to the operating system by calling the first API provided by the embedded SDK under a case that the difficulty level is greater than a preset level threshold.

And the target application module 1210 is also configured to not perform core scheduling under a case that the difficulty level is lower than the preset level threshold.

Alternatively, the operating system module 1220 is also configured to: obtain an application identifier of the target application; feed back the core information to the target application under a case that the application identifier of the target application belongs a preset application identifier list, the preset application identifier list including an application identifier of an application for supporting to perform core scheduling; and not respond to the target request under a case that the application identifier of the target application does not belong the preset application identifier list.

Alternatively, the target application module 1210 is also configured to: schedule the second performance core to operate the process in the system calling way under a case that a foreground operation is switched to a background operation.

In conclusion, in the apparatus for scheduling the processor core according to embodiments of the present disclosure, by embedding the SDK in the target application, the target application may call the API interface provided by the SDK, obtain the core information of the processor of the terminal from the operating system, and then schedule an appropriate processor core to operate a current process based on the core information. In embodiments of the present disclosure, the target application may adaptively schedule a corresponding processor core to operate the process based on the core information, thereby avoiding a jam problem of the application caused by the untimely scheduling of the operating system, and achieving an effect for optimizing the operation quality of the application.

In this embodiment, the target application sets the affinity degree between the process and each core based on the core number of the target core and the process number of the process, such that the operating system binds the process and the target core based on the affinity degree, it is ensured that the process operates on the target core, and the operation quality of the process is improved.

In addition, the target application dynamically determines the target core based on the current application scenario, thereby reducing the power consumption of processor under the low performance application scenario while the operation quality under the performance application scenario is ensured.

In this embodiment, based on the load of the core, the target application selects a core with a lighter load as the target core, thereby reducing the impact on other processes when the core is bound.

Embodiments of the present disclosure also provides a computer readable storage medium. The computer readable storage medium stores at least one instruction. The method for scheduling the processor core described by each embodiment above is implemented when the at least one instruction is loaded and executed by the processor.

Embodiments of the present disclosure also provide a computer program product. The computer program product stores at least one instruction. The method for scheduling the processor core described by each embodiment above is implemented when the at least one instruction is loaded and executed by the processor.

The skilled in the art should mentions that, in one or more of the above examples, the functions described in the embodiments of the present disclosure may be implemented in hardware, software, firmware, or any combination thereof. When the functions are implemented by using the software, these functions may be stored in or transmitted as one or more instructions or codes on a computer readable medium. The computer readable medium includes a computer storage medium and a communication medium. The communication medium includes any medium that facilitates to transfer the computer program from one place to another. The storage medium may be any available medium accessible by a general-purpose or special-purpose computer.

The above description is only the preferred embodiment of the present disclosure, and is not intended to limit the present disclosure. Any modification, equivalent substitution, improvement, and the like made within the spirit and a principle of the present disclosure shall be included in the protection scope of the present disclosure.

What is claimed is:

1. A method for scheduling a processor core, wherein the method is applied to a terminal, a processor in the terminal comprises at least one first performance core and at least one second performance core, a performance of the first performance core is higher than a performance of the second performance core, an operating system and at least one application run on the terminal, and the method comprises:

sending, by a target application, a target request to the operating system by calling a first application programming interface (API) provided by an embedded software development kit (SDK), the target request being used to indicate the operating system to feed back core information of the processor, and the core information comprising configuration conditions of the first performance core and the second performance core;

feeding, by the operating system, the core information back to the target application; and scheduling, by the target application, a target core to operate a process of the target application via system calls based on the core information, comprising:

determining, by the target application, the target core corresponding to the process;

setting, by the target application, an affinity degree between the process and each core via system calls based on a core number of the target core and a process identifier of the process, wherein an affinity degree between the process and the target core is greater than an affinity degree between the process and another core; and binding, by the operating system, the process and the target core based on the affinity degree, wherein the bound process operates on the target core.

2. The method of claim 1, wherein the core information comprises a core type and a core number corresponding to each core, the core type comprises the first performance core and the second performance core.

3. The method of claim 2, wherein determining, by the target application, the target core corresponding to the process comprises:

obtaining, by the target application, a current application scenario;

determining, by the target application, the first performance core as the target core under a case that the current application scenario belongs to a first performance application scenario; and determining, by the target application, the second performance core as the target core under a case that the current application scenario belongs to a second performance application scenario;

wherein a performance requirement of the first performance application scenario for the processor is greater than a performance requirement of the second performance application scenario for the processor.

4. The method of claim 2, wherein the core information comprises load information of each core; and determining, by the target application, the target core corresponding to the process comprises:

obtaining, by the target application, a current application scenario;

determining, by the target application, a load of each core based on the load information;

determining, by the target application, the first performance core of which a load is lower than a load threshold as the target core under a case that the current application scenario belongs to a first performance application scenario; and determining, by the target application, the second performance core of which a load is lower than the load threshold as the target core under a case that the current application scenario belongs to a second performance application scenario;

wherein a performance requirement of the first performance application scenario for the processor is greater than a performance requirement of the second performance application scenario for the processor.

5. The method of claim 1, further comprising:

before sending, by the target application, the target request to the operating system by calling the first API provided by the embedded SDK:

sending, by the target application, a scheduling request to the operating system by calling a second API provided by the embedded SDK, the scheduling request being used to indicate the operating system to feed back a difficulty level for operating the target application;

feeding, by the operating system, the difficulty level back to the target application;

sending, by the target application, the target request to the operating system by calling the first API provided by the embedded SDK under a case that the difficulty level is greater than a preset level threshold; and withholding from performing, by the target application, core scheduling under a case that the difficulty level is lower than the preset level threshold.

6. The method of claim 2, further comprising:

before sending, by the target application, the target request to the operating system by calling the first API provided by the embedded SDK:

sending, by the target application, a scheduling request to the operating system by calling a second API provided by the embedded SDK, the scheduling request being used to indicate the operating system to feed back a difficulty level for operating the target application;

feeding, by the operating system, the difficulty level back to the target application;

sending, by the target application, the target request to the operating system by calling the first API provided by the embedded SDK under a case that the difficulty level is greater than a preset level threshold; and withholding from performing, by the target application, core scheduling under a case that the difficulty level is lower than the preset level threshold.

7. The method of claim 3, further comprising:

before sending, by the target application, the target request to the operating system by calling the first API provided by the embedded SDK:

sending, by the target application, a scheduling request to the operating system by calling a second API provided by the embedded SDK, the scheduling request being used to indicate the operating system to feed back a difficulty level for operating the target application;

feeding, by the operating system, the difficulty level back to the target application;

sending, by the target application, the target request to the operating system by calling the first API provided by the embedded SDK under a case that the difficulty level is greater than a preset level threshold; and withholding from performing, by the target application, core scheduling under a case that the difficulty level is lower than the preset level threshold.

8. The method of claim 4, further comprising:

before sending, by the target application, the target request to the operating system by calling the first API provided by the embedded SDK:

sending, by the target application, a scheduling request to the operating system by calling a second API provided by the embedded SDK, the scheduling request being used to indicate the operating system to feed back a difficulty level for operating the target application;

feeding, by the operating system, the difficulty level back to the target application;

sending, by the target application, the target request to the operating system by calling the first API provided by the embedded SDK under a case that the difficulty level is greater than a preset level threshold; and withholding from performing, by the target application, core scheduling under a case that the difficulty level is lower than the preset level threshold.

9. The method of claim 1, further comprising:

after sending, by the target application, the target request to the operating system by calling the first API provided by the embedded SDK:

obtaining, by the operating system, an application identifier of the target application;

feeding, by the operating system, the core information back to the target application under a case that the application identifier of the target application belongs a preset application identifier list, the preset application identifier list comprising application identifiers of applications for supporting to perform core scheduling; and withholding from responding, by the operating system, to the target request under a case that the application identifier of the target application does not belong the preset application identifier list.

10. The method of claim 2, further comprising:

after sending, by the target application, the target request to the operating system by calling the first API provided by the embedded SDK:

obtaining, by the operating system, an application identifier of the target application;

feeding, by the operating system, the core information back to the target application under a case that the application identifier of the target application belongs a preset application identifier list, the preset application identifier list comprising application identifiers of applications for supporting to perform core scheduling; and withholding from responding, by the operating system, to the target request under a case that the application identifier of the target application does not belong the preset application identifier list.

11. The method of claim 3, further comprising:

after sending, by the target application, the target request to the operating system by calling the first API provided by the embedded SDK:

obtaining, by the operating system, an application identifier of the target application;

feeding, by the operating system, the core information back to the target application under a case that the application identifier of the target application belongs a preset application identifier list, the preset application identifier list comprising application identifiers of applications for supporting to perform core scheduling; and withholding from responding, by the operating system, to the target request under a case that the application identifier of the target application does not belong the preset application identifier list.

12. The method of claim 4, further comprising:

after sending, by the target application, the target request to the operating system by calling the first API provided by the embedded SDK:

obtaining, by the operating system, an application identifier of the target application;

feeding, by the operating system, the core information back to the target application under a case that the application identifier of the target application belongs a preset application identifier list, the preset application identifier list comprising application identifiers of applications for supporting to perform core scheduling; and withholding from responding, by the operating system, to the target request under a case that the application identifier of the target application does not belong the preset application identifier list.

13. The method of claim 1, further comprising:

after scheduling, by the target application, the target core to operate the process of the target application via system calls based on the core information, scheduling, by the target application, the second performance core to operate the process via system calls under a case that a foreground operation is switched to a background operation.

14. The method of claim 2, further comprising:

after scheduling, by the target application, the target core to operate the process of the target application via system calls based on the core information, scheduling, by the target application, the second performance core to operate the process via system calls under a case that a foreground operation is switched to a background operation.

15. The method of claim 3, further comprising:

after scheduling, by the target application, the target core to operate the process of the target application via system calls based on the core information, scheduling, by the target application, the second performance core to operate the process via system calls under a case that a foreground operation is switched to a background operation.

16. The method of claim 4, further comprising:

after scheduling, by the target application, the target core to operate the process of the target application via system calls based on the core information, scheduling, by the target application, the second performance core to operate the process via system calls under a case that a foreground operation is switched to a background operation.

17. An apparatus for scheduling a processor core, wherein the apparatus is applied to a terminal, a processor in the terminal comprises at least one first performance core and at least one second performance core, a performance of the first performance core is higher than a performance of the second performance core, an operating system and at least one application run on the terminal, and the apparatus comprises:

one or more processors, a memory storing instructions executable by the one or more processors, wherein the one or more processors are configured to:

send a target request from a target application to the operating system by calling a first application programming interface (API) provided by an embedded software development kit (SDK), the target request being used to indicate the operating system to feed back core information of the processor, and the core information comprising configuration conditions of the first performance core and the second performance core;

feed the core information back to the target application; and schedule a target core to operate a process of the target application via system calls based on the core information, comprising:
determine the target core corresponding to the process; and
set an affinity degree between the process and each core via system calls based on a core number of the target core and a process identifier of the process, wherein an affinity degree between the process and the target core is greater than an affinity degree between the process and another core; and
the operating system is configured to bind the process and the target core based on the affinity degree, wherein the bound process operates on the target core.

18. The apparatus of claim 17, wherein the core information comprises a core type and a core number corresponding to each core, the core type comprises the first performance core and the second performance core.

19. The apparatus of claim 18, wherein the one or more processors are configured to:
obtain a current application scenario;
determine the first performance core as the target core under a case that the current application scenario belongs to a first performance application scenario; and
determine the second performance core as the target core under a case that the current application scenario belongs to a second performance application scenario;
wherein a performance requirement of the first performance application scenario for the processor is greater than a performance requirement of the second performance application scenario for the processor.

20. A non-transitory computer readable storage medium, wherein the non-transitory storage medium stores at least one instruction, when the at least one instruction is executed by a processor, the processor is caused to perform a method for scheduling a processor core, the method is applied to a terminal, a processor in the terminal comprises at least one first performance core and at least one second performance core, a performance of the first performance core is higher than a performance of the second performance core, an operating system and at least one application run on the terminal, and the method comprises:
sending, by a target application, a target request to the operating system by calling a first application programming interface (API) provided by an embedded software development kit (SDK), the target request being used to indicate the operating system to feed back core information of the processor, and the core information comprising configuration conditions of the first performance core and the second performance core;
feeding, by the operating system, the core information back to the target application; and
scheduling, by the target application, a target core to operate a process of the target application via system calls based on the core information, comprising:
determining, by the target application, the target core corresponding to the process;
setting, by the target application, an affinity degree between the process and each core via system calls based on a core number of the target core and a process identifier of the process, wherein an affinity degree between the process and the target core is greater than an affinity degree between the process and another core; and
binding, by the operating system, the process and the target core based on the affinity degree, wherein the bound process operates on the target core.

* * * * *